United States Patent
Ante et al.

(10) Patent No.: US 7,994,779 B2
(45) Date of Patent: Aug. 9, 2011

(54) METHOD FOR CONTINUOUSLY DETERMINING THE TENSILE FORCE F IN A CABLE OF A PARKING BRAKE

(75) Inventors: Johannes Ante, Regensburg (DE); Juergen Ehret, Weinheim (DE)

(73) Assignee: Continental Automotive GmbH, Hannover (DE)

( * ) Notice: Subject to any disclaimer, the term of this patent is extended or adjusted under 35 U.S.C. 154(b) by 473 days.

(21) Appl. No.: 12/161,782

(22) PCT Filed: Jan. 12, 2007

(86) PCT No.: PCT/EP2007/050270
§ 371 (c)(1),
(2), (4) Date: Nov. 7, 2008

(87) PCT Pub. No.: WO2007/082835
PCT Pub. Date: Jul. 26, 2007

(65) Prior Publication Data
US 2010/0301848 A1   Dec. 2, 2010

(30) Foreign Application Priority Data
Jan. 23, 2006  (DE) .......................... 10 2006 003 173

(51) Int. Cl.
*G01R 33/18* (2006.01)

(52) U.S. Cl. ................ 324/209; 188/1.11 R; 188/1.11 E

(58) Field of Classification Search .................... None
See application file for complete search history.

(56) References Cited

U.S. PATENT DOCUMENTS 6,194,856 B1 *  2/2001  Kobayashi et al. ........... 318/432
6,254,267 B1 *  7/2001  Arnaud ....................... 366/137.1

FOREIGN PATENT DOCUMENTS

DE   10 2004 025 361    3/2005
WO   WO 98/56633        12/1998

* cited by examiner

*Primary Examiner* — Ha Tran T Nguyen
*Assistant Examiner* — Trung Q Nguyen
(74) *Attorney, Agent, or Firm* — Cohen Pontani Lieberman & Pavane LLP

(57) ABSTRACT

Presented is a method for continuously determining the tensile force F in a cable of a parking brake that includes transmitting the tensile force F to a cable grommet coupled to a first end of an expandable intermediate part that includes a magnet and/or a magnetic sensor. The first end of the expandable intermediate part faces away from a drive spindle coupled to a second end of the expandable intermediate part. The method further includes changing the length of the expandable intermediate part in the direction of its longitudinal axis in response to the transmitted tensile force F, moving the magnet and the magnetic sensor relative to each other in response to the change in length, changing the signal voltage of the magnetic sensor in response to the relative movement between the magnet and the magnetic sensor, and determining the tensile force F from the respective signal voltage.

5 Claims, 2 Drawing Sheets

METHOD FOR CONTINUOUSLY DETERMINING THE TENSILE FORCE F IN A CABLE OF A PARKING BRAKE

CROSS-REFERENCE TO RELATED APPLICATION

This is a U.S. national stage of International Application No. PCT/EP2007/050270, filed on 12 Jan. 2007. Priority is claimed on German Application No. 10 2006 003 173.3, filed on 23 Jan. 2006.

BACKGROUND OF THE INVENTION

1. Field of the Invention

The invention relates to a method for continuously determining the tensile force F in a cable parking brake.

2. Description of the Related Art

Methods for continuously determining the tensile force in cables of parking brakes are known. DE 10 2004 025 361 A1 describes an electromagnetically activatable parking brake for motor vehicles. According to the method described there for determining the tensile force in the cable it is provided that at least one part of the force measurement device is integrated into at least one brake cable such that the transmission of the tensile stress force is effected via the part. A disadvantage with this is that the cable has to be divided into several sections, between which force measurement devices are then located.

SUMMARY OF THE INVENTION

The object of the invention is thus to create a method for continuously determining the tensile force in a cable of a parking brake in which the cable need not be interrupted. The arrangement of force measurement devices directly inside the cable should then be dispensed with entirely.

The object underlying the invention is achieved by a method for continuously determining the tensile force F in a cable of a parking brake, in which the tensile force F is transferred to a cable grommet, which is positioned on an end of an expandable or meandering intermediate part with a magnet and/or a magnetic sensor, said end facing away from a drive spindle and said expandable intermediate part undergoing a change of length in the direction of its longitudinal axis as a result of the tensile force F, whereby the change in length effects a relative movement between the magnet and the magnetic sensor, as a result of which the signal voltage of the magnetic sensor is changed, and the tensile force F is then determined from the respective signal voltage. The tensile force F is applied by means of the drive spindle, which for example has a circular cross-section. To this end the drive spindle is connected to a drive. The expandable intermediate part is formed at least partly in the shape of a wave in cross-section, the waves being formed by alternating folds in the intermediate part. Generally it consists of a metal material. However, it is also possible to manufacture the expandable intermediate part from a plastic. The expandable intermediate part is permanently connected either to a magnet and/or to a magnetic sensor. If the expandable intermediate part is now subjected to a change in length, then either the magnet or the magnetic sensor moves in a longitudinal direction in corresponding fashion, depending on whether the magnet or the magnetic sensor is permanently positioned on the expandable intermediate part. The magnet and the magnetic sensor are thus functionally linked to one another. If the magnet is attached to the expandable intermediate part, the magnetic sensor is arranged directly adjacent to the expandable intermediate part in the area of the magnetic field of the magnet or vice versa. As a result of the tensile force F and the associated change in length of the expandable intermediate part both magnet and magnetic sensor undergo a movement relative to one another. This means that the magnetic sensor is moved in the magnetic field of the magnet, which has a direct effect on the signal voltage of the magnetic sensor. The signal voltage of the magnetic sensor is thus functionally linked to the applied tensile force F in the cable. The tensile force F can thus be calculated directly from the change in the signal voltage, generally with the aid of computers. Hall sensors are for example used as preferred magnetic sensors, with which a precise determination of the tensile force F is possible in conjunction with minimal installation space. The positioning of the cable grommet on the end of the expandable intermediate part facing away from the drive spindle can for example be by means of a form-fit. It is also possible, depending on the material selected, to weld the cable grommet to the expandable intermediate part or if appropriate to manufacture them as a single part. The expandable intermediate part is generally manufactured as a single part in the area of its wave structure. However, this is not absolutely necessary. It has surprisingly been shown that a continuous determination of the tensile force F can be performed particularly advantageously in this manner, thereby ensuring that no force measurement devices have to be arranged directly inside the cable.

A preferred embodiment of the invention consists in introducing the tensile force F into a expandable intermediate part which in cross-section has 3 to 4 half waves. In this way the tensile force F can be determined with a relatively high degree of precision, the installation space being simultaneously optimally reduced.

According to a further preferred embodiment of the invention it is provided that the tensile force F is transferred to a cable grommet which has an extension in the direction of the drive spindle, said extension being routed through a through-hole in the expandable intermediate part and its end being connected to the drive spindle. The extension is generally executed as a single part. It is not essential that the extension be made of the same material as the cable grommet. It is also possible to manufacture the extension from the material from which the cable is manufactured. It may thus also be possible for the extension itself to be formed from a part of the cable, the cable grommet then permanently enclosing the cable. In each case the extension is so embodied and dimensioned that in normal operation it is not subject to the tensile force F. It has no function for the normal operation of the method, but is provided only in case of emergency if the expandable intermediate part is damaged. It is advantageous here that in the event that the expandable intermediate part for example ruptures in the center, the function of the parking brake is not completely eliminated. At the same time the rupturing of the expandable intermediate part is immediately apparent in operation of the parking brake in this emergency situation during the determination of the tensile force F by the method. The end of the extension, which can for example be formed so as to be enlarged, is here positioned in particularly advantageous manner in a drill hole of the drive spindle and in this manner is connected to the drive spindle.

According to a further preferred embodiment of the invention the tensile force F is introduced into a expandable intermediate part which is connected to the drive spindle by welding. This advantageously increases the operational safety of the method.

BRIEF DESCRIPTION OF THE DRAWINGS

The invention is explained in further detail below with reference to the attached drawings.

DETAILED DESCRIPTION OF THE PREFERRED EMBODIMENTS

Figure 1:
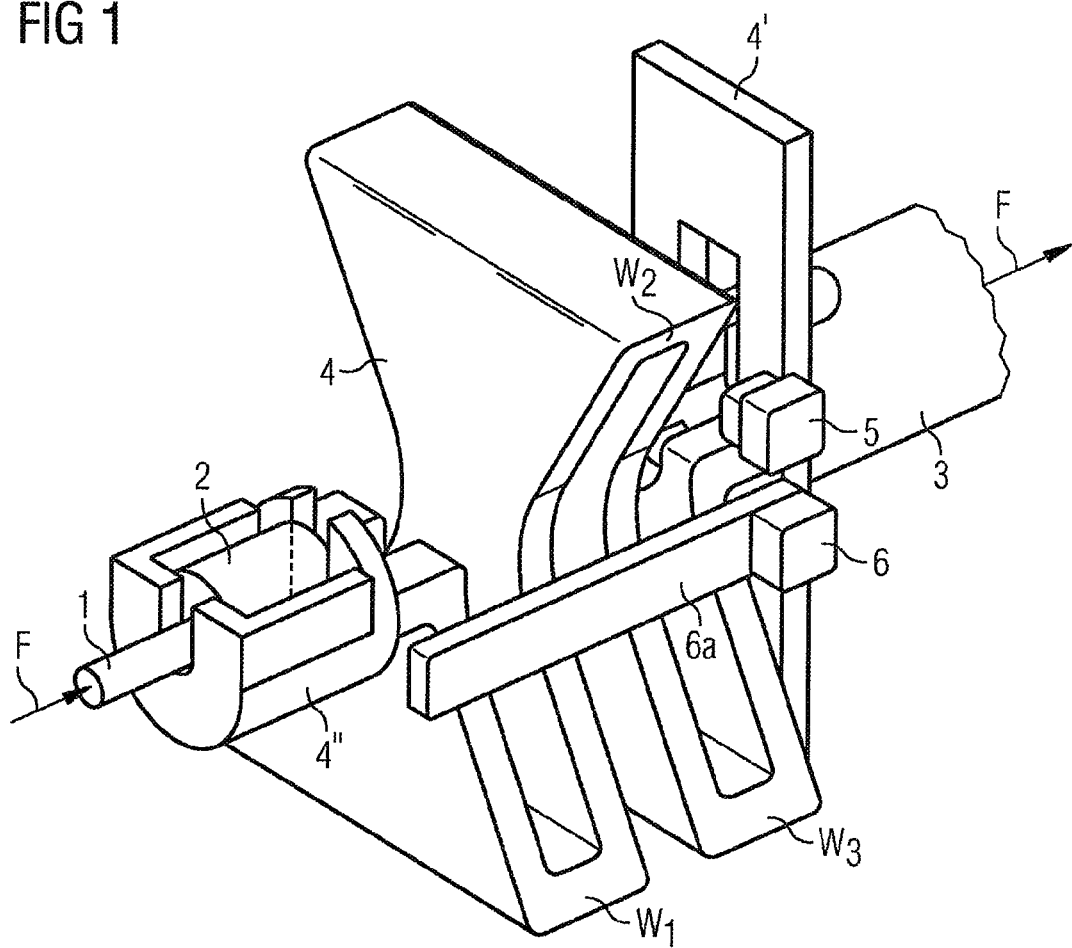
FIG. 1 is an illustrative perspective view of a cable, an expandable intermediate part, and a drive spindle, according to one embodiment of the invention.

FIG. 1 shows a cable 1, an expandable intermediate part 4 and the a drive spindle 3 in three-dimensional form. The cable 1 has a cable grommet 2 at its end, which is positioned on the an end 4" of the expandable intermediate part 4, the end 4" facing away from the drive spindle 3. The expandable intermediate part 4 has a magnet 5. As a result of the effect of the tensile force F the expandable intermediate 4 part undergoes a change in length in the direction of its longitudinal axis, which gives rise to a relative movement between the magnet 5 and a magnetic sensor 6 which is arranged adjacent to the expandable intermediate part 4. The magnet 5 and the magnetic sensor 6, which is arranged on a carrier 6a, are here in functional interplay with one another. The carrier 6a can for example be affixed to a housing (not shown). The expandable intermediate part 4 has 3 waves W1, W2, W3 and on its end facing the drive spindle 3 has a connection piece 4', to which the drive spindle 3 is permanently connected. This can be done for example by welding, so long as the expandable intermediate part 4 and the drive spindle 3 consist of a corresponding metal material. In the method for continuously determining the tensile force F in the cable 1 of a parking brake the tensile force F is initially introduced via the drive spindle 3 and is transmitted to the cable grommet 2. As a result the expandable intermediate part 4 undergoes a change in length in the direction of its longitudinal axis. This change in length results in a relative movement between the magnet 5 and the magnetic sensor 6, as a result of which the signal voltage of the magnetic sensor 6 is changed. The tensile force F is then determined from the respective signal voltage, this generally being done by a computer (not shown). The magnetic sensor 6 thus has corresponding connections for the supply voltage and the signal voltage (not shown).

Figure 2:
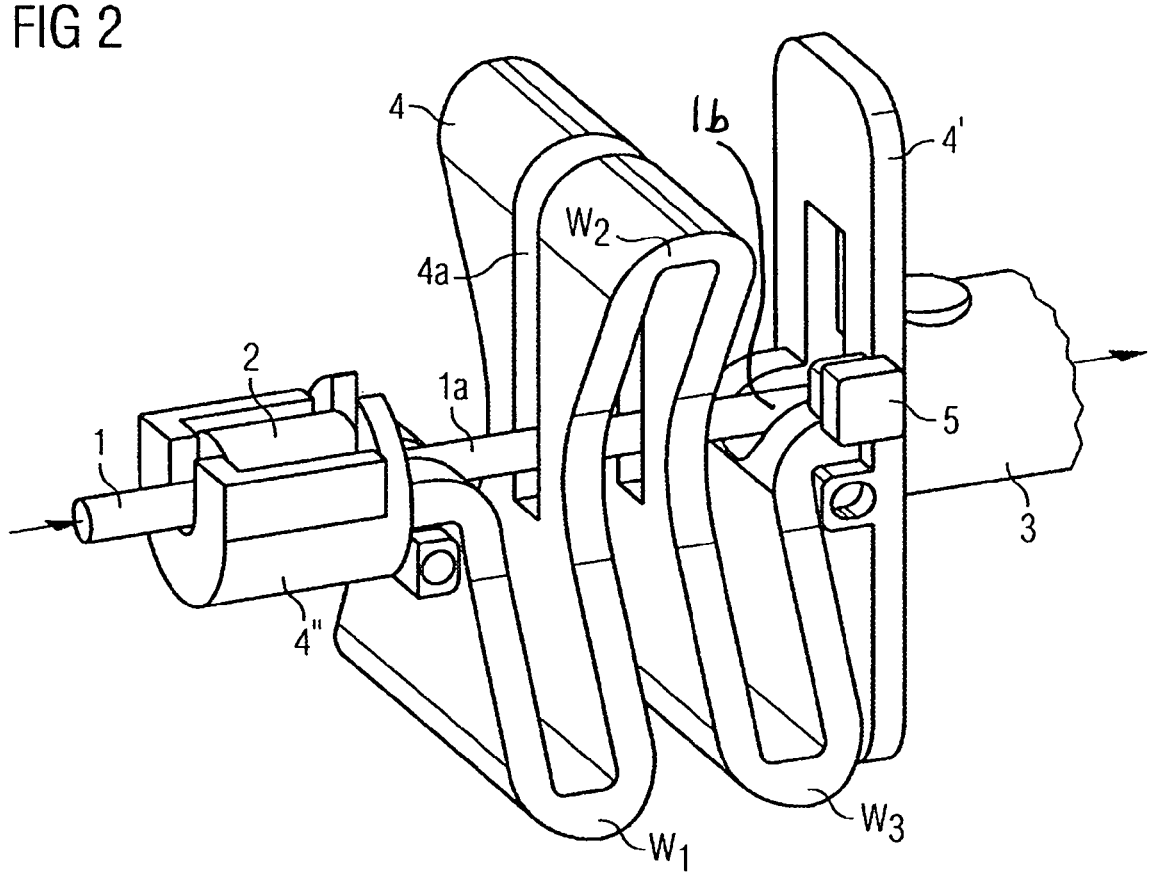
FIG. 2 is an illustrative perspective view of a cable, an expandable intermediate part, and a drive spindle, according to one embodiment of the invention.

FIG. 2 shows the cable 1, the expandable intermediate part 4 and the drive spindle 3 in an alternative embodiment, likewise in three dimensions. The cable grommet 2 has an extension 1a in the direction of the drive spindle 3, said extension 1a being routed through a through-hole 4a in the expandable intermediate part 4, and an end 1b of the extension 1a, which in cross-section is embodied thicker than the actual extension 1a, is connected to the drive spindle 3. The magnetic sensor and the carrier as in FIG. 1 have not been shown here for reasons of clarity. If in the event of a fault the expandable intermediate part 4 is ruptured, it is ensured that the drive spindle 3 is nonetheless connected to the cable 1 via the extension 1a and the cable grommet 2, so that the function of the parking brake is not completely eliminated. Only if this emergency situation occurs is the tensile force applied to the extension 1a, which is generally embodied so as to be flexible. Such damage to the expandable intermediate part 4 is then also immediately recorded by the method for continuously determining the tensile force F, so that countermeasures can be initiated.

What is claimed is:

1. A method for continuously determining the tensile force F in a cable of a parking brake, comprising:
   transmitting the tensile force F in a parking brake cable to a cable grommet coupled to a first end of an expandable intermediate part, the expandable intermediate part comprising at least one of a magnet and a magnetic sensor, the first end of the expandable intermediate part facing away from a drive spindle coupled to a second end of the expandable intermediate part;
   changing the length of the expandable intermediate part in the direction of its longitudinal axis in response to the transmitted tensile force F;
   moving the magnet and the magnetic sensor relative to each other in response to the change in length;
   changing the signal voltage of the magnetic sensor in response to the relative movement between the magnet and the magnetic sensor; and
   determining the tensile force F from the respective signal voltage.

2. The method as claimed in claim 1, wherein the expandable intermediate part, in cross-section, has 3 to 4 waves.

3. The method as claimed in claim 1, wherein the cable grommet comprises an extension extending in the direction of the drive spindle, said extension is routed through a through-hole in the expandable intermediate part, and the end of the extension is connected to the drive spindle, said method further comprising applying the tensile force F to the extension when the expandable intermediate part ruptures.

4. The method as claimed in claim 3, further comprising the step of recording, by the magnet and the magnetic sensor, the rupture of the expandable intermediate part.

5. The method as claimed in claim 1, wherein the expandable intermediate part is connected to the drive spindle by welding.

* * * * *